W. P. MURPHY.
DEVICE FOR MANIPULATING THE LOCKING PINS OF CAR COUPLINGS.
APPLICATION FILED APR. 13, 1914.
1,118,948.
Patented Dec. 1, 1914.
2 SHEETS—SHEET 1.
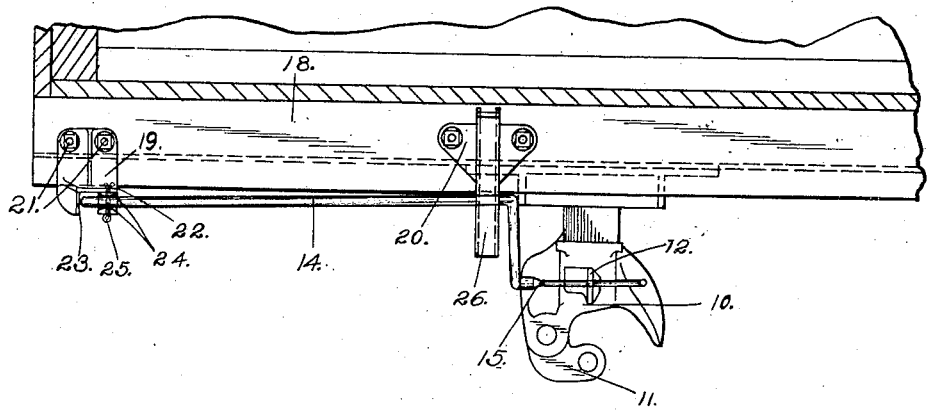
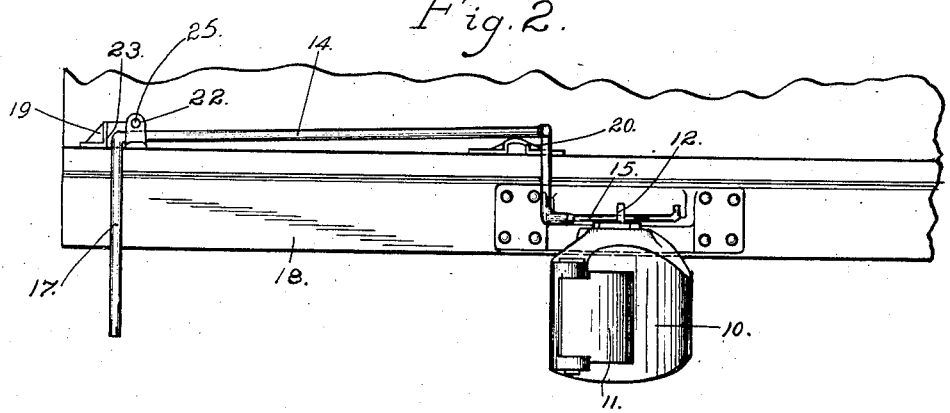
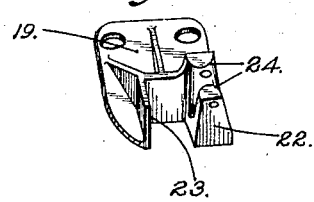
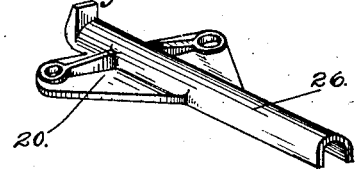
WITNESSES:
H. M. Gillespie
J. B. Lagorio, Jr.
INVENTOR.
Walter P. Murphy
BY Barnett & Trundau
ATTORNEYS

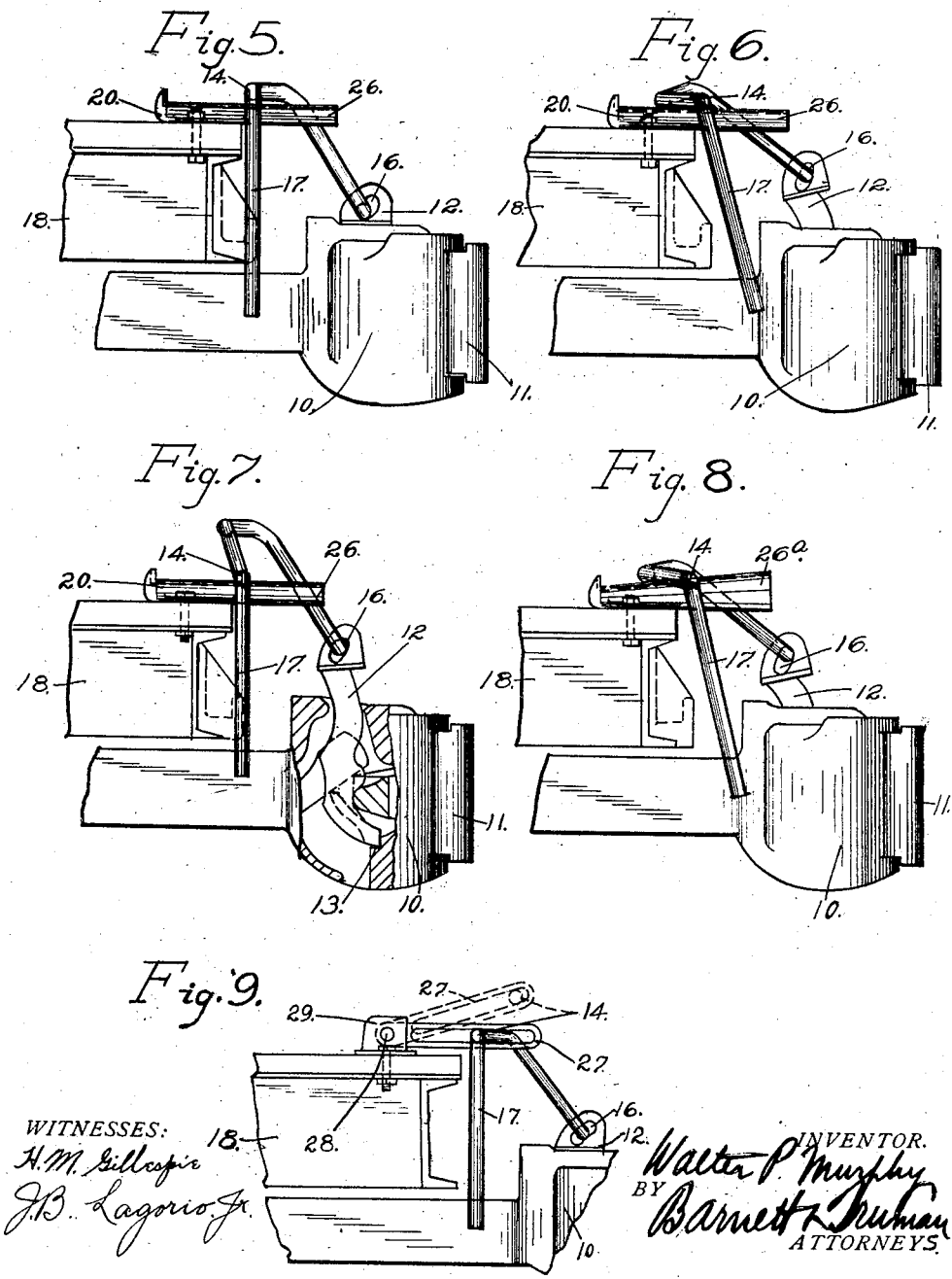

UNITED STATES PATENT OFFICE.

WALTER P. MURPHY, OF CHICAGO, ILLINOIS.

DEVICE FOR MANIPULATING THE LOCKING-PINS OF CAR-COUPLINGS.

1,118,948.    Specification of Letters Patent.    Patented Dec. 1, 1914.

Application filed April 13, 1914. Serial No. 831,579.

*To all whom it may concern:*

Be it known that I, WALTER P. MURPHY, a citizen of the United States residing at Chicago, in the county of Cook and State of Illinois, have invented certain new and useful Improvements in Devices for Manipulating the Locking-Pins of Car-Couplers, of which the following is a specification.

My invention relates to a device for manipulating the locking pin or equivalent element of a car coupler from a position of safety remote from the coupler, for example, from the side of the car.

It has been customary to construct devices of this general class of two members, one passing through the eye of the locking pin of the coupler, or otherwise suitably connected therewith, the other provided with a manipulating part or handle, the members having a loose connection or joint between them which is intended to allow the coupler its normal movements without disturbing the locking pin. One-piece uncoupling devices have also been used to a certain extent, these devices consisting ordinarily of a rod revolubly mounted on the end of the car with the inner end bent to form a crank which is engaged with the locking pin and the outer end provided with an angularly disposed handle. From the point of view of strength, simplicity and economy of construction and durability, the one-piece uncoupling device is superior to the two-piece device. It has this disadvantage, however, that when the locking pin is in lock-set position, in certain switching operations for example, the handle is raised from its normal vertical position along side the end of the car to a horizontal or angular position. In this position it presents an objectionable obstruction between the cars and, furthermore, tends, by its weight and leverage, to make the lock setting of the pin unstable. The objection to the ordinary one-piece uncoupling lever did not apply at the time when chains were used for connecting the locking pin to the levers since if a chain of any considerable length be interposed between the locking pin and the lever, the lever will be capable of return to its normal position, or nearly so, after the pin has been lock-set. But the use of a chain in this connection is very undesirable and has been condemned and forbidden by the authorities.

My invention has for its primary object to provide an uncoupling mechanism utilizing a single operating member which may be engaged directly with the coupler locking pin, for example, may extend through the eye thereof, and which is so mounted on the car as to allow the coupler its necessary normal movements without disturbance of the locking pin and so that in the lock set position of the locking pin the handle portion of the operating member will, or can be made to, assume the same position, or substantially the same position which it occupies with the pin in locking position, for example, a substantially vertical position close to the car sill.

The invention has for a further object to provide a new and improved device for manipulating the locking pin of car couplers which will be simple in its construction, inexpensive to manufacture, readily applicable to the car on which it is used and which can be employed, with possible slight adaptations, within the capacity of any mechanic, to manipulate the locking pin or equivalent element of any of the standard types of car couplers now in use.

The invention is illustrated, in certain preferred embodiments, in the accompanying drawings wherein—

Figure 1 shows a plan view of an uncoupling mechanism constructed in accordance with the invention, the mechanism being shown as applied to the end of a freight car for manipulating the locking pin of a coupler of the type in which the pin is raised to free the knuckle. Fig. 2 is a view, in elevation, of the same apparatus; Figs. 3 and 4, perspective views of the outer and inner bearing members respectively, on which the operating element or lever is sustained; Fig. 5, a side elevation of the apparatus showing the coupler pin in locking position; Fig. 6, a similar view showing the pin raised to free the knuckle; Fig. 7, a similar view, but with certain parts of the coupler in section, illustrating the position which the uncoupling lever assumes when the locking pin is in lock-set position; Fig. 8, a side view of a modified form of apparatus, and Fig. 9, a similar view illustrating another modification.

Like characters of reference designate like parts in the several figures of the drawings.

Referring first to Figs. 1 to 7 inclusive, 10 designates the head of the coupler, 11 the knuckle and 12 the locking pin which in lock-set position (Fig. 7) rests upon a shoulder 13. The operating element of the uncoupling mechanism consists preferably of a rod 14 formed at its inner end with a crank 15 which is suitably engaged with the locking pin 12. For example, it may extend through the eye 16 formed in the upper end of the pin; the outer end of the rod 14 being bent so as to provide an angularly disposed handle 17. The rod or lever 14 is supported on the end of the car 18 by an outer bearing member 19 and an inner bearing member 20. The former consists preferably of a plate suitably formed for attachment to the car by means, for example, of bolts 21 provided with a forked portion 22 to revolubly support the rod 14 and with a stop plate 23 which serves to keep the rod from longitudinal displacement. The uprights of the fork 22 have their inner surfaces 24 rounded, preferably, so that the rod may rock in its bearing with the in and out movements of the coupler. The rod may be kept in position in the fork 22 by means of any suitable retaining device, such as the cotter pin 25 shown in the drawings. The inner bearing member 20 consists of a suitable attaching plate formed with an outwardly extended arm or elongated bearing 26. The rod 14 rests upon the arm 26 at a point close to the crank 15. It is free to slide back and forth on the arm 26, the top of which is preferably rounded for this purpose. The lever is also free to move upwardly away from the arm.

The operation of the device will be best understood by referring to Figs. 5, 6 and 7. Fig. 5 shows the position of the uncoupling lever when the coupler pin 12 is in its locking position. To raise the pin so as to free the knuckle the handle 17 is lifted to the position shown in Fig. 6. If it is desired to lock-set the pin this may be done, in the particular type of coupler shown for the purpose of illustrating the invention, by giving the lever a slight inward shift on its bearing 26, which may be brought about by lifting the handle 17 a trifle so that the end of the pin will engage the shoulder 13. When this engagement is brought about the uncoupling lever, if released, will revolve axially on the outer bearing 22 and on the bearing provided at the crank end of the lever by the pin 12, the part of the lever supported on the arm 26 being raised therefrom and the handle 17 dropping down to the normal vertical position, as shown in Fig. 7, that is, substantially the same position which the handle occupies when the coupler pin is in the locking position. The above stated operation assumes a proper balancing of the lever whereby gravity will bring about the desired result. Even if the lever is not constructed so that it will so operate when released, it may be readily made to assume a position with the handle 17 vertical, or substantially so, by pushing down on the handle after the locking pin of the coupler has become lock-set.

In certain types of coupler, for example the type shown in the drawings, the locking pin is brought into locking position a little more readily if the inner bearing member has its bearing surface slanted upwardly away from the car as shown at 26ª in Fig. 8. This figure shows the parts in the position which they will assume when the locking pin is lock-set, and just before, by release or pushing upon the handle 17, the device rocks away from the inner bearing. If the slant of the upper surface of bearing member 26ª were sufficiently sharp an outward movement of the coupler would disturb the locking pin 12. With the trifling slant sufficient to accomplish the result desired, there is no danger of disturbing the pin particularly if the eye of the pin 16 is elongated a little as shown in the drawings.

Fig. 9 illustrates another modification. In this construction, which is otherwise the same as that previously described, the inner bearing consists of a slotted bearing member 27 which is pivoted at 28 to a clevis 29 on the end of the car. When the portion of the uncoupling lever which passes through the slotted bearing member 27 is raised after the coupler pin has been lock set, the bearing member will turn on its pivot 28 rising with the lever.

While I have described my invention in certain preferred embodiments, modifications in the form and construction of the parts might be made without departure from the principle of the invention. Therefore I do not wish to be understood as limiting the invention to the exact constructions, arrangements and devices shown and described except so far as certain of the claims herein are so limited by their express language.

The lever in the coupler which is moved by the uncoupling lever has been termed in the claims a "locking pin". The term is not intended to be used in a narrow signification but is intended to cover any movable device or part or parts, the function of which is to lock or hold in operative position the knuckle of the coupler.

I claim:

1. The combination with a car coupler having a locking pin formed with an eye, of a device for manipulating said pin comprising a rod formed at one end with an angularly disposed handle and at the other with a crank portion extending through the eye of said pin, a bearing to support the rod adjacent the handle, and a bearing intermediate said first named bearing and the crank portion of the rod providing a fulcrum for the rod during the pin lifting operation on which the rod can slide to and from the car and which permits the rod to revolve axially on said first named bearing and the locking pin when the pin is in lock set position to allow said handle to return to substantially the place which it occupies when the pin is in locking position.

2. The combination with a car coupler having a locking pin formed with an eye, of a device for manipulating said pin comprising a rod formed at one end with an angularly disposed handle and at the other with a crank portion extending through the eye of said pin, a bearing to support the rod adjacent the handle, and an elongated bearing having an upward slant away from the car intermediate said first named bearing and the crank portion of the rod providing a fulcrum for the rod during the pin lifting operation on which the rod can slide to and from the car and which permits the rod to revolve axially on said first named bearing and the locking pin when the pin is in lock set position to allow said handle to return to substantially the place which it occupies when the pin is in locking position.

3. The combination with a car coupler having a locking pin formed with an eye, of a device for manipulating said pin comprising an operating element having a crank portion extending through the eye of said pin, and an angularly disposed manipulating portion, and bearings for said element which permit said element to revolve axially on one of said bearings and said pin when the pin is in lock set position so that the manipulating portion of said element may assume substantially the same position with said locking pin in either locking or lock-set position.

4. A device for manipulating the locking pin of a car coupler comprising a rod adapted to immediately engage said locking pin and formed at one end with an angularly disposed handle, an outer bearing on the car for revolubly sustaining said rod, and means adjacent the point of engagement of the rod with said locking pin providing a fulcrum for the rod during the pin lifting operation which permits the rod to revolve axially supported on said bearing and locking pin when the pin is in lock-set position.

5. A device for manipulating the locking pin of a car coupler comprising a rod formed with a crank adapted to immediately engage said locking pin and with an angularly disposed handle, and a retaining device for revolubly supporting the handle end of the rod; the rod being free to revolve axially on the points of engagement with the pin and said retaining device, for the purpose described.

6. A device for manipulating the locking pin of a car coupler comprising a rod formed with a crank adapted to immediately engage said locking pin and with an angularly disposed handle, a retaining device for revolubly supporting the handle end of the rod, and means constituting a bearing for the rod intermediate said locking pin and said retaining device; said rod being free to turn away from said intermediate bearing on its points of engagement with said locking pin and said retaining device.

7. A device for manipulating the locking pin of a car coupler comprising a rod formed with a crank adapted to engage said locking pin and with an angularly disposed handle, a retaining device for revolubly supporting the handle end of the rod, and means constituting an elongated bearing intermediate said locking pin and said retaining device on which the rod is slidable to and from the car; said rod being free to turn away from said intermediate bearing on its points of engagement with said locking pin and said retaining device.

8. A device for manipulating the locking pin of a car coupler comprising a rod formed with a crank adapted to engage said locking pin and with an angularly disposed handle, a retaining device for revolubly supporting the handle end of the rod, and means constituting an elongated bearing slanting upwardly in the direction away from the car and intermediate said locking pin and said retaining device on which the rod is slidable to and from the car; said rod being free to turn away from said intermediate bearing on its points of engagement with said locking pin and said retaining device.

9. A device for manipulating the locking pin of a car coupler comprising a revoluble operating rod adapted to be engaged with the locking pin of the coupler and formed at its outer end with an angularly disposed handle, and a retaining device for the handle end of said rod formed with a bifurcated portion in which said rod is revolubly sustained, and a stop plate arranged outwardly of the bend between said rod and its handle.

10. A device for manipulating the locking pin of a car coupler comprising a rod formed at one end with a crank adapted to engage the locking pin of a coupler and at the other with an angularly disposed handle, a retaining device for revolubly supporting the handle end of said rod, and a bearing member arranged adjacent said crank comprising an attaching plate and an outwardly projecting arm with the upper surface of which said rod has a sliding engagement.

11. The combination with a car coupler having a locking pin formed with an eye, of an end coupling rod formed at one end with a crank extending through the eye of said pin and at the other with an angularly disposed handle, a retaining device for the handle end of said rod consisting of an attaching plate formed with a fork in which said rod is revolubly sustained and with a stop plate arranged outwardly of the bend between said rod and its handle, and a bearing member for slidably supporting the portion of the rod adjacent said crank comprising an attaching plate having an outwardly projecting arm on the upper surface of which said rod bears.

WALTER P. MURPHY.

Witnesses:
L. A. FALKENBERG,
H. M. GILLESPIE.